July 31, 1962
G. P. HURST ET AL
3,047,159
BOAT LAUNCHING APPARATUS
Filed March 14, 1960
5 Sheets-Sheet 1
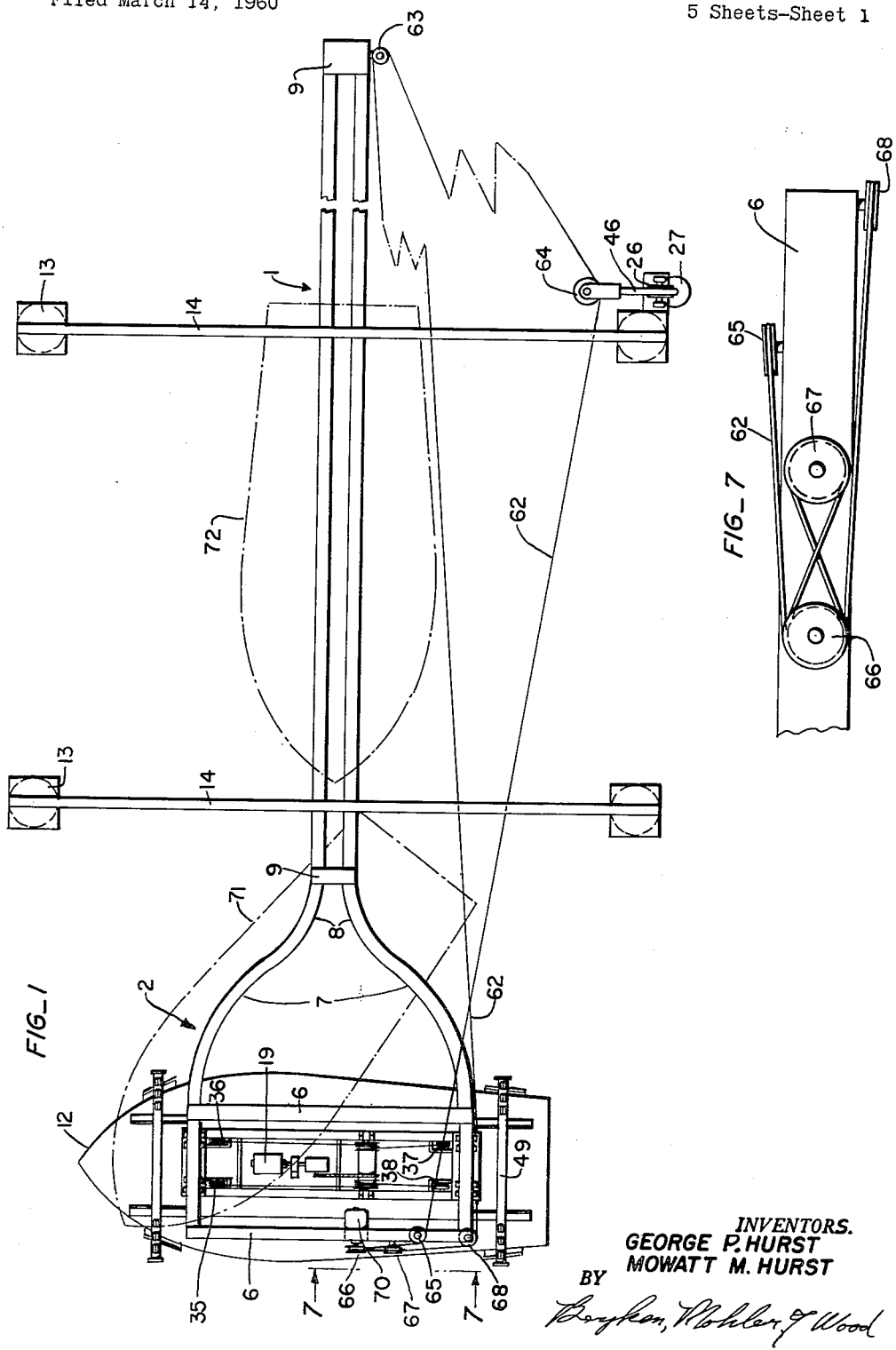
INVENTORS.
GEORGE P. HURST
MOWATT M. HURST
BY
*Boykin, Mohler & Wood*
ATTORNEYS

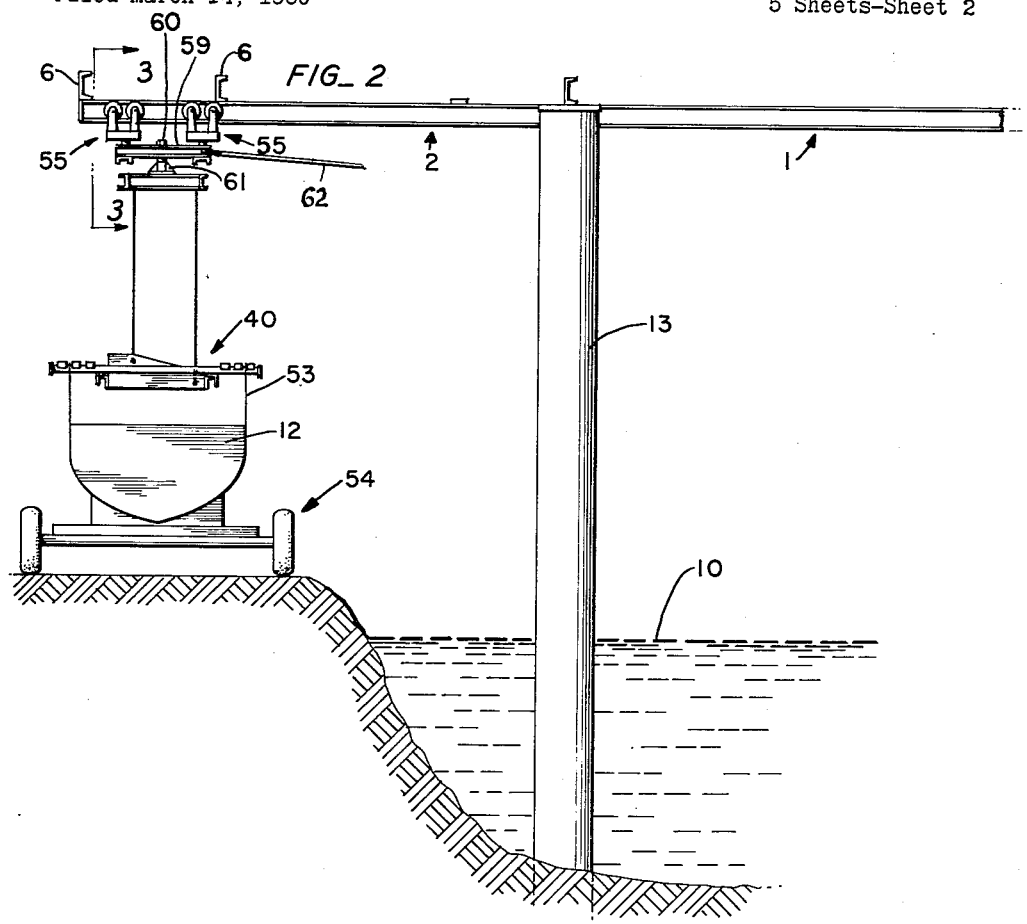
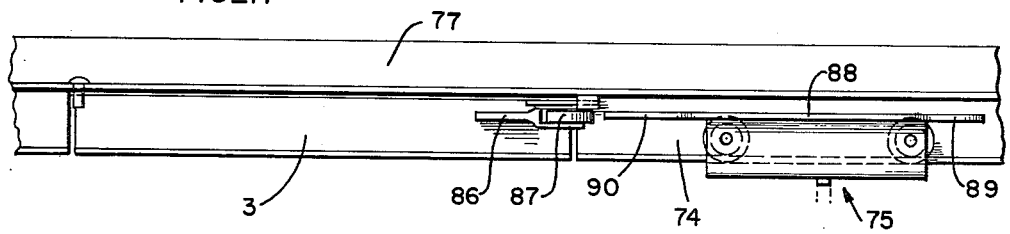

July 31, 1962
G. P. HURST ET AL
3,047,159
BOAT LAUNCHING APPARATUS
Filed March 14, 1960
5 Sheets-Sheet 3
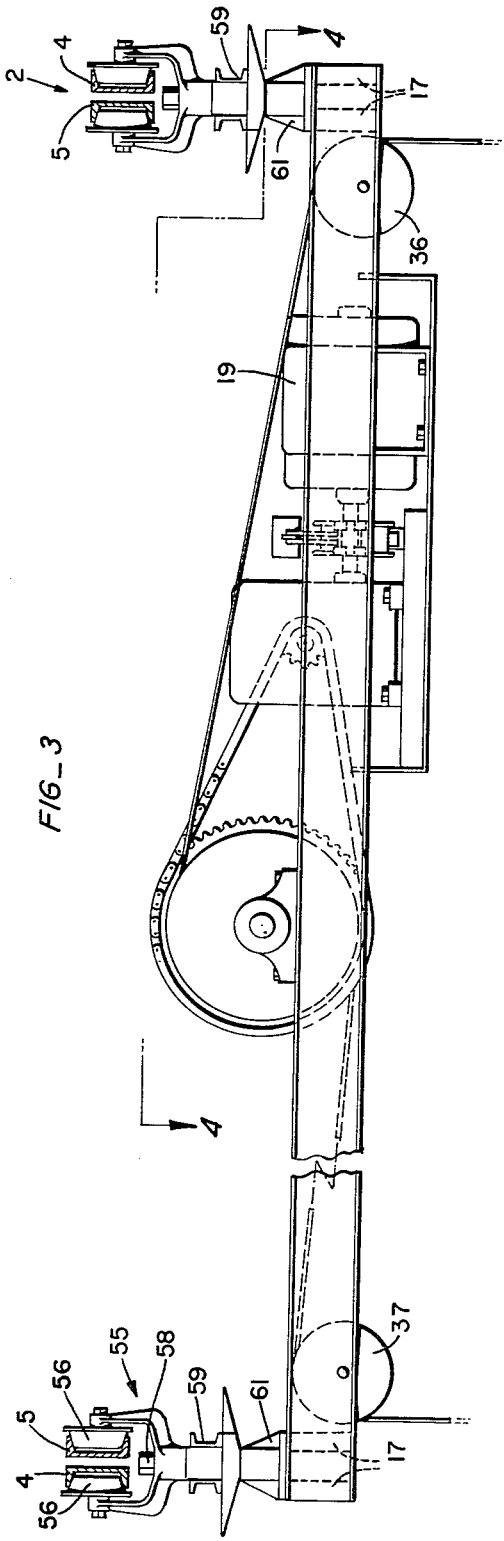
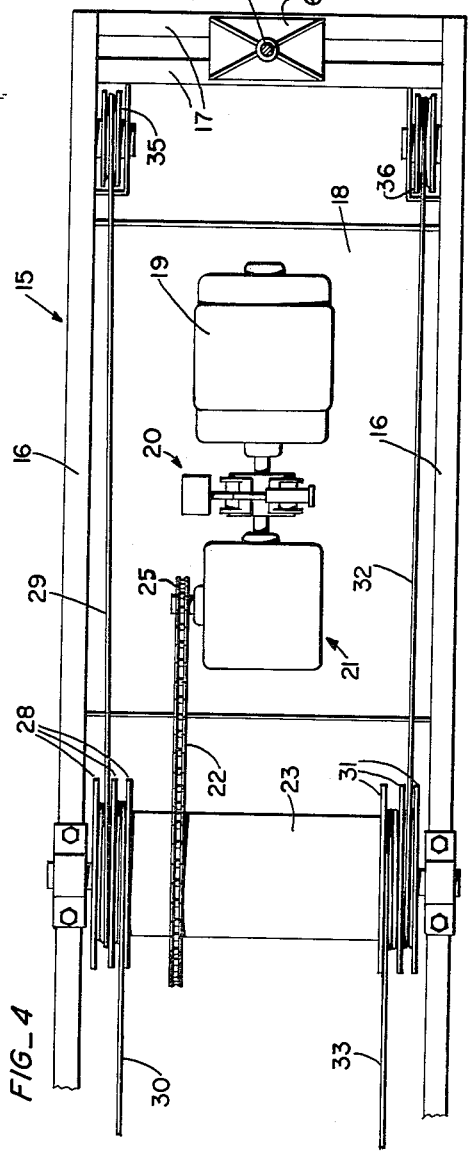
INVENTORS.
GEORGE P. HURST
MOWATT M. HURST
BY
*Boyken, Mohler & Wood*
ATTORNEYS

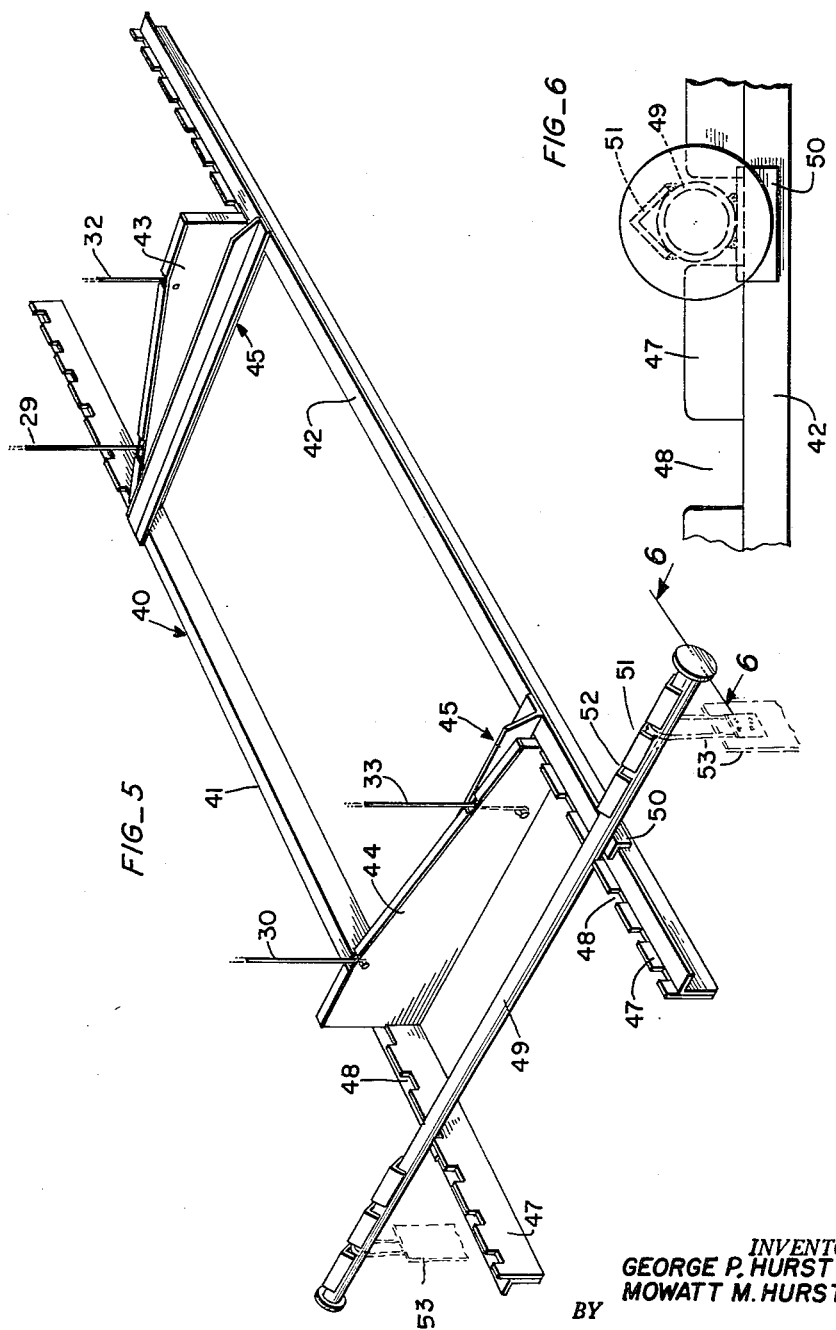

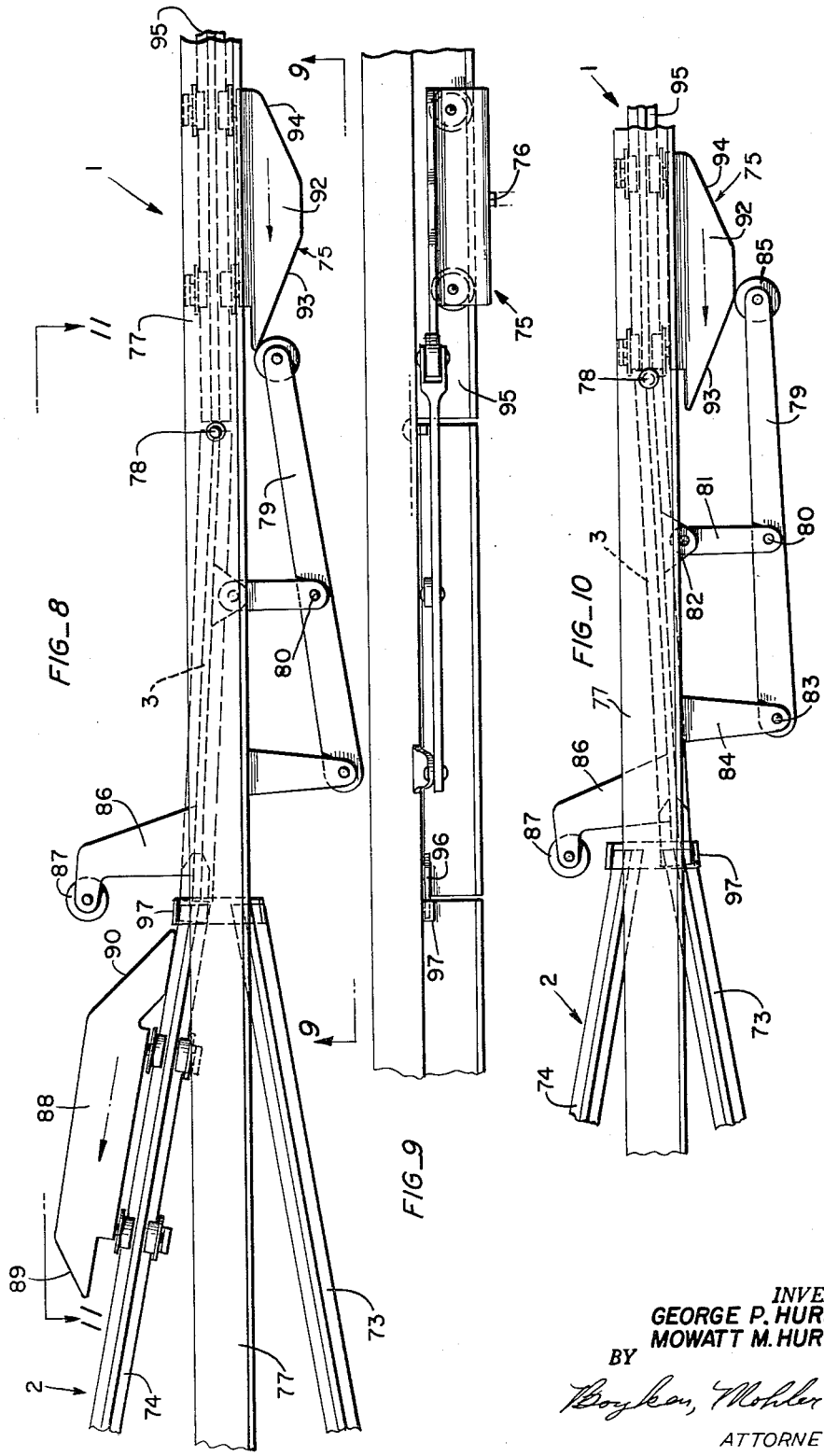

United States Patent Office 3,047,159
Patented July 31, 1962

3,047,159
BOAT LAUNCHING APPARATUS
George P. Hurst and Mowatt M. Hurst, both of 946 Bransten Road, San Carlos, Calif.; said Mowatt M. Hurst assignor to said George P. Hurst
Filed Mar. 14, 1960, Ser. No. 14,891
11 Claims. (Cl. 212—20)

This invention relates to a boat launching apparatus, and to a method of launching a boat that is on a trailer and which trailer is on a bank or shore adjoining a body of water into which the boat is to be launched.

Usually where a boat is to be launched from an automobile drawn trailer, the trailer is backed into the water and the boat is floated off the trailer or is moved rearwardly off the trailer and into the water with the stern of the boat foremost, or leading. Sometimes a ramp extends from the shore into the water, but whether or not such ramp exists, the trailer is usually partially or wholly immersed in the water, which is particularly objectionable in the case of a body of salt water. Also there are frequent instances in which the automobile connected with the trailer, and used to manipulate the latter, becomes stuck in the sand or mud, or also moves into the body of water. Furthermore, there are circumstances where the safe movement of the automobile or trailer connected thereto may be restricted to a relatively short distance, and where success in staying within the safe limits is difficult.

The problems in retrieving a boat are greater than in launching a boat, since gravity may contribute to the launching but opposes retrieving the boat.

With the present method, the trailer, with the boat thereon, and the automobile connected with the trailer, are not backed into or toward the water, but are kept on safe ground in positions generally parallel with the shoreline. The boat is then lifted off the trailer from above and while suspended from above, it is moved toward the water and automatically rotates about its vertical axis through substantially 90 degrees so its longitudinal, horizontal axis will be approximately at a right angle to the shoreline when the boat is over the water. The boat is then lowered to a floating position on the water and is released for such further movement as may be desired, all being accomplished within a relatively restricted space and substantially free from swaying of the boat.

The boat is retrieved by being lifted out of the water in the same position relative to the shoreline as when it was launched. After being lifted out of the water, from above, it is turned about its vertical axis to a position substantially parallel with the shoreline during movement thereof toward said shoreline, and is deposited on the trailer that is in the same position as that when the boat was removed.

During the movement and turning of the boat, it is suspended from its opposite ends from four spaced vertically extending cable or rope lengths instead of being suspended from one or two points, and the boat is positively guided, free from manual manipulation, and is free from tilting, swaying, and swinging. Four vertically extending lengths of rope or cable suspend the boat, two of said lengths being at the bow end of the boat and two at the stern end, and these are arranged so that the boat will be stable irrespective of the distribution of the weight of the boat and its cargo or contents, which is distinctively different from the situations in which the boat may be suspended from one or two points.

One of the objects of the invention is the provision of the above explained method, and another object of the invention is the provision of a boat launching apparatus having the general structure above explained and adapted to function in the manner described.

Another object of the invention is the provision of a relatively simple, economically made, reliable, easily installed and easily actuated apparatus for launching boats.

A still further object of the invention is the provision of a boat launching device that is adapted to safely lift a boat off a trailer, that is parallel with the shoreline, and to convey the boat directly toward the body of water adjacent to the trailer, by the shortest distance, and to positively rotate the boat about a vertical axis while it is so conveyed, free from rocking, tilting and swinging of the boat, to a position in which the longitudinal axis of the boat is substantially at right angles to the shoreline.

Other objects and advantages will appear in the description and drawings.

In the drawings:

FIG. 1 is a semi-diagrammatic top plan view of the apparatus, shortened in length, with a boat in a position as lifted off a trailer preparatory to movement of the boat over the water, the successive movements of the boat during its movement being indicated in dot-dash lines.

FIG. 2 is a fragmentary side elevational view of the apparatus shown in FIG. 1 omitting one end portion thereof that terminates over the water.

FIG. 3 is a side elevational view of the carriage that is supported from the overhead carriage support, certain parts that are shown in FIGS. 1 and 7 being omitted for clarity.

FIG. 4 is a fragmentary top plan view of the carriage of FIG. 3 as seen from line 4—4 of FIG. 3.

FIG. 5 is an isometric view of the frame, below the carriage of FIG. 1 from which the boat slings are suspended.

FIG. 6 is an enlarged fragmentary end view of part of the frame of FIG. 5 as seen from line 6—6 of FIG. 5.

FIG. 7 is an enlarged fragmentary view of part of the carriage as seen from line 7—7 of FIG. 1.

FIG. 8 is a fragmentary top plan view of a switch in a carriage support that eliminates the use of a portion of the tracks shown in FIG. 1.

FIG. 9 is a view of FIG. 8 as seen from line 9—9 of FIG. 8.

FIG. 10 is a view similar to that of FIG. 8 but showing the switch in a different position than shown in FIG. 8.

FIG. 11 is a view of FIG. 8 as seen from line 11—11 of FIG. 8, but reversed end for end.

In detail, the overhead carriage support of the present invention, and which support carries the carriage that, in turn, carries the boat, is horizontally elongated, providing a leg portion generally designated 1, and a pair of arm portions generally designated 2, extending divergently from one end of the leg portion 1 to relatively widely spaced parallel relationship.

In FIG. 1 the leg portion and arm portions are a pair of overhead tracks, while in FIG. 8 the leg portion may be a single track and the arm portions a pair of tracks with a switch 3 adapted to connect the single track with one or the other tracks of the arm portions as will later be described more in detail.

As seen in FIG. 3 each arm portion 2 may comprise a pair of oppositely horizontally outwardly opening channels 4, 5 that are rigidly secured together by any suitable means, such as cross members 6 (FIG. 2), and these pairs of channels forming both arm portions curve toward each other as at 7 and then curve at 8 oppositely to curves 7 and to parallel side by side relationship to form the leg portion. The channels of the leg portions may also be rigidly secured together by any suitable means, such as cross pieces 9.

In FIG. 1 the channels forming the leg and arm portions are diagrammatically indicated as single elements, since they could be I strips providing the channels at opposite sides of a web, in certain instances.

The leg portion 1 of the carriage supporting tracks is supported horizontal and elevated above the body of water 10 (FIG. 2) into which boats 12 are to be launched, by spaced pairs of posts 13. Beams 14 extend across the leg portion at right angles thereto and are supported at their ends on said posts. These beams are welded or otherwise suitably secured to the portions of channels 4, 5 that form the leg portion. Any number of pairs of posts may be used for supporting the leg portion 1 as far out over the water as may be necessary.

The arm portions 2 are free from any obstruction therebelow to positioning a boat 12 therebelow in a position extending at right angles to the leg portion 1 with the bow of the boat under one arm portion and the stern under the other. The use of the words "bow" and "stern" is intended to refer to the parts of the boat that may be fore and aft of the central portion, since longer boats will extend greater distances past the arms 2 than the shorter boats.

A horizontally elongated carrier 15 is suspended below the overhead tracks. This carriage (FIGS. 3, 4) comprises side frame members 16, end members 17 and a platform 18 carried by said side frame members intermediate said end members. This platform supports a motor 19 thereon and any suitable conventional power transmission elements including a brake 20, a gear box 21, the latter having a driven shaft that carries a sprocket wheel 25 and if desirable this box 21 may be a variable speed transmission although since a substantially uniform speed is usually maintained, it is more economical to merely change the sprocket wheel 25 if a slower or faster speed is found to be desirable. This sprocket wheel is connected by a chain 22 with a sprocket wheel carried on drum 23. Drum 23, in turn, has a central shaft rotatably mounting it on the side frame members in a position intermediate the ends of the carriage 15 and extending between said side frame members.

Spaced annular rims or flanges 28 on drum 23 at one end thereof provide a pair of guideways on the drum for a pair of cables 29, 30, while similar rims or flanges 31 on the other end of the drum provide guideways for a pair of cables 32, 33. These cables are wound on the drum, the cables 29, 32 extending from the drum to the end of the carriage adjacent the motor 19 where they pass over sheaves 35, 36 respectively, the said sheaves being carried by said carriage.

Cables 30, 33 extend to the end frame members 17 that are at the end of the carriage opposite to sheaves 35, 36, and said cables pass over sheaves 37, 38 (FIGS. 1, 3) that are similar to sheaves 35, 36.

The arrangement of the cables 29, 30, 32, 33 is such that upon rotation of the drum 23 in one direction, the cables will all be wound onto the drum between the pairs of rims or flanges that form the guideways therefor, while upon rotation of the drum in the opposite direction the cables will be unwound.

The cables 29, 30, 32, 33 depend from the sheaves 35—38 for connection at their lower ends with a sub frame 40 (FIG. 5) having parallel spaced side frame members 41, 42 that are connected at points adjacent to but spaced from said members by end members 43, 44. Cross members 45 respectively adjacent to each of said end members 43, 44 may be welded or otherwise suitably secured to members 43, 44 and said cross members 45, in turn, may be welded or otherwise suitably secured to the side frame members.

The member 43 is wider, vertically, at one end than at the other, and cable 32 connects at its lower end with the upper end of the wider portion of the member 43 while cable 29 connects with the narrower portion, hence cable 32 is shorter in its vertical length from sheave 36 than the length of cable 29 from sheave 35 to member 43.

The end member 44 and the cable connections thereto are similar to the arrangement described for member 43, except that the wider part of member 44 is adjacent to side frame member 41 instead of 42. The wider portion (vertically) of member 43 is adjacent to side frame member 42.

As seen in FIG. 5 the end members 43, 44 may be of box structure with the cables extending vertically into them and connected with pins rigid with the opposite sides of the box, although other structure may be used.

By the above arrangement, the sub frame 40 may be lowered a substantial distance below the carriage and will not swing about its vertical axis or sway due to the different lengths of the cables suspending the sub frame, and the diagonally opposite positioning of the cables of similar lengths. This is highly important since conventional means usually employ slings that are suspended from two points, and in some instances from one point. With the present method of suspension the boat is as stable as though the rope lengths were rigid rods.

The side frame members 41, 42 project at their opposite ends beyond the end members 43, 44. Rigid with the projecting ends are plates or strips 47 extending longitudinally of said projecting ends, which strips are formed with spaced, upwardly opening notches 48. The notches or recesses 48 in strip 47 at one side are in registration or alignment with notches 48 in the strip that is opposite thereto.

A pair of elongated bars 49 respectively over the projecting ends of the side frame members 41, 42 at opposite ends of the frame 40 are adapted to extend across said projecting ends and to fit in the pairs of aligned notches in plates 47. Each of these bars projects past the side frame members, and is provided with angle seats 50 adapted to rest on the side frame members 41, 42 when the bars are positioned in aligned notches 48. Also the upper sides of the bars have spaced inverted V-shaped pieces 51 rigidly secured thereto providing spaced upwardly opening recesses 52 at the upper sides of the projecting ends of bars 49 in which the eyes at the upper ends of cables connected with the upper ends of a U-belt 53 are adapted to be seated. Thus a U-belt or loop is adapted to be provided at each end of the sub frame 40 for passing below the bow and stern ends of a boat 12 (FIG. 2). Such belt 53 is adjustable for wide or narrow boats according to the recesses 52 in which the ends of the cables are seated. The bars 49 may be quickly adjusted for longer or shorter boats.

Rotation of the drums 23 in one direction by motor 19, which is reversible, will effect lifting a boat off a trailer 54 (FIG. 2) while rotation of the drum in the opposite direction will effect lowering such boat.

By the above structure, it will be seen that a trailer may be drawn by an automobile along a shoreline, parallel therewith, to a position below the arm portion 2 of the overhead carriage support. This is a distinct advantage over the method of launching whereby one is compelled to back the trailer to the water line or into the water, since a stable, solid road may be easily provided along the shoreline spaced from the water.

The next step, after the boat is lifted off the trailer is to move the boat to the body of water, and to do this the boat must be turned to enter the water, preferably, stern foremost.

The structure for accomplishing the above results comprises the provision of several pairs of overhead trolleys or trucks 55 (FIG. 2) each having two pairs of rollers 56 respectively supported in the oppositely outwardly opening channels 4, 5 for rolling on the lower flange of each (FIG. 3). Each truck carrying two opposed pairs of the rollers is swivelly connected by a vertical pin 58 (FIG. 3) for swiveling about the vertical axis of each pin 58 and which pin connects the trucks with each end of a connecting bar 59. Each said connecting bar is swivelly connected by a vertical pin 60, for swiveling about the vertical axis of each pin 60, to a casting 61 secured centrally of end members 17 of carriage 15 (FIG. 4). Pin 58 and pin 60 may be similarly constructed and may take the form of a steel bolt with a head on one end and the other end threaded and provided with a lock nut thus enabling said pins to carry the weight of carriage 15, sub frame 40 and boat 12. The swiveling movement about pin 58 allows each truck 45 to roll freely along curved arm 2 (FIG. 1) whereas swiveling about pin 60 allows carriage 15 (and boat 12) to turn from a position parallel with the shoreline to a position at right angles to the shoreline.

A cable 62 (FIG. 1) is secured at one end thereof to one end of the bow 59 at one end thereof or at one of the ends of the end members 17. This end is preferably at the end of the carriage that will be over the stern end of the boat, and at the side that faces the leg portion 1 when the boat is in the full line position shown in FIG. 1.

From the carriage 15, the cable 62 extends to the end of the leg portion 1 that is remote from the arm portions 2 and around a sheave 63 secured to said end of leg portion 1.

From sheave 63 cable 62 extends to and around a take-up sheave 64, which sheave may be connected with one end of a wire rope 46, which rope extends over a roller 26 carried by one of the posts at one end of one of the beams 14 most remote from the arm portions 2, and at the same side of the overhead track or carriage support as that to which the stern end of the boat projects, as seen in FIG. 1. The other end of wire rope 46 is attached to weight 27 which keeps rope 62 under a constant slight tension.

From the take-up sheave 64, cable 62 extends to a sheave 65 (FIGS. 1, 7) that is carried by and projects above the stationary cross member 6 that is most remote from leg portion 1. This sheave 65 is rotatable about a generally vertical axis.

From sheave 65, cable 62 extends over one of a pair of horizontally spaced vertically disposed sheaves 66, 67 that are secured at the side of the member 6 that carries sheave 65. These sheaves 66, 67 are at the side of said member 6 that is most remote from leg portion 1 of the overhead support when the carriage is in the position shown in FIG. 1; with sheave 67 being nearer to sheave 65 than sheave 66.

The rope or cable 62 extends from sheave 65 over sheave 66 and then upwardly and around sheave 67 and back and upwardly over and around sheave 66 and back to a horizontally disposed sheave 68 that is adjacent to the terminating end of cross frame member 6. From sheave 68 the cable extends to the opposite end of bow 59 as the end to which other end of the cable is attached, but at the opposite side.

The sheave 66 is actually secured on a shaft driven by a reversible motor 70.

Upon driving the sheave 66 in one direction the carriage 15 will be moved from its position with the boat in full line position in FIG. 1 toward the leg portion 1 and it will automatically be swung to move the boat successively through dot dash line positions 71, 72 in which latter position the boat is in a launching position in which its longitudinal axis is parallel with the leg portion of the carriage support. When the boat is in position 72, the motor 19 may be actuated to lower the boat into the water, where it will float free of loops 53.

A reversal of the above operation is effected for picking up a boat. The latter is brought under the leg portion 1. Loops 53 are positioned below the bow and stern ends and the motor 19 is actuated to lift the boat out of the water. The motor 70 is then actuated to bring the boat back to its full line position of FIG. 1 and in coming back to said latter position, the carriage 15 will automatically make the necessary turn to position the boat in said full line position. The trailer 54 is then positioned below the boat and motor 19 is actuated to lower the boat onto the trailer.

It is obvious that conventional limit switches, not shown, may be provided to automatically limit the travel of the carriage 15 on the overhead carriage support and to limit the raising and lowering of the sub frame 40.

In certain instances it has been found desirable to use only a single T or I strip for track 95 of the leg portion 1 of the carriage support, and T or I for tracks 73, 74 (FIG. 8) for the arm portion 2. In the case of the T strips, they are inverted so the flanges support the roller of the trucks 75 from which the carriage depends about the pins 76 (FIGS. 8, 11) that correspond to pins 58 of FIG. 3.

An angle strip 77 secured to and parallel with the leg portion of the carriage support may extend straight past the converging ends of the tracks 73, 74 (FIG. 8). This strip 77 is secured above the track 95 and a gap between the end of track 95 and the spaced converging ends of tracks 73, 74 has a switch track 3 thereon.

Switch 3 is connected at its end adjacent to track 95 by a vertical pivot pin 78 so that the opposite end of the switch track will swing to connect said opposite end with either the track 73 or track 74. Said opposite end of the switch track 3 has a horizontally disposed flat member 96 (FIG. 9) which is secured as by welding to the upper portion of track 3, one end of said member extending in line with and outwardly past the end of switch 3. An elongated horizontally disposed transversely positioned supporting member 97 is secured as by welding to the lower surface of angle strip 77 in such position as to provide a hanger for the extending portion of flat member 96 while permitting the same to move freely between positions adjacent to track 74 and track 73.

A switch actuating lever 79 is along one side of the switch 3 (FIGS. 8, 10), which lever is pivotally connected intermediate its ends, at 80, with one end of a link 81, which link is pivotally connected at its opposite end with a laterally projecting ear 82 secured to one side of said switch 3.

The end of lever 79 adjacent to the converging ends of tracks 73, 74 is pivotally connected at 83 with a lateral projection 84 that is rigid with the strip 77 that is over the tracks.

The end of lever 79 opposite to pivot 83 carries a cam follower 85, which follower is adjacent to the end portion of track 95 and opposed thereto.

The end of switch 3 that terminates at the converging ends of the tracks 74 has an arm 86 projecting laterally therefrom to the side thereof that is opposite to the side adjacent to the switch lever 79. This arm 86 carries a roller 87 at its other end, which roller is about opposite to the converging ends of the tracks 73, 74.

Secured to the trucks 75 at one end of the carriage (the left end as seen in FIGS. 8, 10) is a cam 88 having a leading inclined cam surface 89 and a trailing cam surface 90. This cam projects to the same side of the overhead tracks as the arm 86. The truck 75 at the right end of the carriage, as seen in FIGS. 8, 10 has a cam 92 thereon that has a leading cam surface 93 at one end and a trailing cam surface 94 at the other end. In both FIGS. 8, 10 the leading ends of the cams will be considered the left ends since the illustration shows the trucks being moved to the left to carry the carriage to the left. Cam 92 is on the same side of the trucks 75 as lever 79.

These cams 88, 92 are laterally projecting and cam 88 is positioned to engage roller 87, while cam 92 is positioned to engage cam follower 85.

Assuming the movement of the overhead carriage that carries the boat hoisting and lowering mechanism, and that carries the boat, is being moved to the left as seen in FIG. 8 from a position on the single track 95, it will be seen that the cam 88 will engage the roller 87 to swing the switch so that the trucks 75 at the leading end of the carriage will move onto the track 74.

After the leading trucks are on the track 74, the cam 92 will engage the cam follower 85 to swing the switch 3 into register with track 73 (FIG. 10), and continued movement of the carriage to the left will result in the trailing trucks 75 moving onto track 73. The final position of the carriage will be the same as in FIG. 1.

Upon reverse movement of the carriage from left to right, the previously trailing trucks 75 will move back onto track 95, and as the now trailing trucks move toward track 95 the cam surface 90 of the cam 88 will engage the roller 87 and switch 3 will be automatically swung back to the position shown in FIG. 8 in which the switch 3 connects with track 74. Thus the rollers on the carriage supporting trucks will all move onto the track 95 and the boat will be carried to the same position below track 95 as is indicated at 72 in FIG. 1.

It is obvious that the leg 1 of the carriage supporting means, whether a single or double track, may extend as far over the water as is necessary. While the water along the shoreline is shallow it may be longer than where it is deep. In any event, a minimum amount of shoreland is required and the arrangement indicated is safer and more economical, and far more simple than where turntable apparatus may be employed or where a single track may be curved at one end to carry the boat around a curve to a position parallel with the shoreline.

Also the present arrangement provides a steady support for the boat, so the latter will not swing and in which it will not turn except under positive control and guidance. The economies involved are particularly important both as to structure and as to manipulation. One person can easily and safely launch a boat with the present equipment. Tilting of the boat, transversely thereof, is prevented by the pins 60. Thus the boat will remain stable, even though laterally unbalanced.

It is to be understood that the claims appended hereto are not intended to necessarily be restricted to the precise structure described, but are intended to cover any modifications and improvements as may come within the scope thereof. It is also to be understood that while the claims specifically mention boats, the apparatus and method are not to be considered as being restrictive for use with boats, since the same apparatus is adapted to handle other loads.

We claim:

1. Boat launching apparatus comprising: a horizontally extending, overhead, generally Y-shaped carriage support providing a horizontally elongated leg portion and a pair of arm portions extending divergently from one end of said leg portion to horizontally spaced relation; means supporting said carriage support in a position with said arm portions spaced above the shore adjoining the body of water into which a boat is to be launched and with said leg portion spaced above said body; a carriage having a forward and a rear end, means on said carriage for suspending a boat therefrom with the bow and stern of said boat adjacent to said forward and rear ends respectively, means mounting said carriage on said carriage support for movement thereof from a position with said forward and rear ends respectively carried by said arm portions to a position onto said leg portion with said forward and rear ends on a line substantially parallel with said leg portion whereby a boat suspended from said carriage during said movement thereon from said arms to said leg portion will be rotated about a vertical axis through approximately 90 degrees and to a position for launching into said body of water.

2. Boat launching apparatus comprising: a horizontally extending, overhead, generally Y-shaped carriage support providing a horizontally elongated leg portion and a pair of arm portions extending divergently from one end of said leg portion to horizontally spaced relation; means supporting said carriage support in a position with said arm portions spaced above the shore adjoining the body of water into which a boat is to be launched and with said leg portion spaced above said body; a carriage having a forward and a rear end, means on said carriage for suspending a boat therefrom with the bow and stern of said boat adjacent to said forward and rear ends respectively, means mounting said carriage on said carriage support for movement thereof from a position with said forward and rear ends respectively carried by said arm portions to a position onto said leg portion with said forward and rear ends on a line substantially parallel with said leg portion whereby a boat suspended from said carriage during said movement thereon from said arms to said leg portion will be rotated about a vertical axis through approximately 90 degrees and to a position for launching into said body of water, the said means mounting said carriage for said movement including rollers at said forward and rear ends supporting said carriage for movement on said arm portions and leg portion and vertical swivel means between said rollers and said forward and rear ends for swiveling said forward and rear ends about separate vertical axes.

3. Boat launching apparatus comprising: a horizontally extending, overhead, generally Y-shaped carriage support providing a horizontally elongated leg portion and a pair of arm portions extending divergently from one end of said leg portion to horizontally spaced relation; means supporting said carriage support in a position with said arm portions spaced above the shore adjoining the body of water into which a boat is to be launched and with said leg portion spaced above said body; a carriage having a forward and a rear end, means on said carriage for suspending a boat therefrom with the bow and stern of said boat adjacent to said forward and rear ends respectively, means mounting said carriage on said carriage support for movement thereof from a position with said forward and rear ends respectively carried by said arm portions to a position onto said leg portion with said forward and rear ends on a line substantially parallel with said leg portion whereby a boat suspended from said carriage during said movement thereon from said arms to said leg portion will be rotated about a vertical axis through approximately 90 degrees and to a position for launching into said body of water, a cable adjacent to said carriage support and stationarily anchored at its ends, and power means on said carriage connected with said cable for movement along the latter upon actuation of said power means for moving said carriage from said arm portions onto said leg portion and vice versa.

4. Boat launching apparatus comprising: a horizontally extending, overhead, generally Y-shaped carriage support providing a horizontally elongated leg portion and a pair of arm portions extending divergently from one end of said leg portion to horizontally spaced relation; means supporting said carriage support in a position with said arm portions spaced above the shore adjoining the body of water into which a boat is to be launched and with said leg portion spaced above said body; a carriage having a forward and a rear end, means on said carriage for suspending a boat therefrom with the bow and stern of said boat adjacent to said forward and rear ends respectively, means mounting said carriage on said carriage support for movement thereof from a position with said forward and rear ends respectively carried by said arm portions to a position onto said leg portion with said forward and rear ends on a line substantially parallel with said leg portion whereby a boat suspended from said carriage during said movement thereon from said arms to said leg portion will be rotated about a vertical axis through approximately 90 degrees and to a position for launching into said body of water, said means for suspending a boat from said carriage including a horizontally elongated frame below said carriage having one end thereof adjacent to said forward end and the other end thereof adjacent to said rear end and a pair of horizontally spaced side frame members extending between and connecting said ends, a pair of vertically extending cables respectively adjacent to said side frame members suspending each end of said frame from each end of said carriage, one of the cables of each pair adjacent to opposite of said frame members being shorter than the other to prevent objectionable swinging of said frame horizontally, boat carrying means carried by said frame for suspending a boat therebelow, and power means connected with said cables for moving them vertically to lift a boat engaged by said boat carrying means and to lower such boat.

5. Boat launching apparatus comprising: a horizontally extending, overhead, generally Y-shaped carriage support providing a horizontally elongated leg portion and a pair of arm portions extending divergently from one end of said leg portion to horizontally, relatively, widely spaced parallel relation; means supporting said carriage support in a position with said arm portions spaced above the shore adjoining the body of water into which a boat is to be launched and with said leg portion spaced above said body, said arm portions being free from obstruction therebelow to moving a vehicle having said boat thereon to a position with the bow of said boat below and adjacent to one arm portion of said pair and with the stern of said boat below and adjacent to the other arm portion, a carriage supported on said carriage support for movement from said arm portions and extending between them to a position at right angles thereto and on said leg portion, means for so supporting said carriage and supporting said carriage for automatic rotation thereof about its vertical axis during said movement from said arm portion to said leg portion, means on said carriage for lifting a boat from such vehicle below said arm portions and for suspending said boat from said carriage during said movement of the latter.

6. Boat launching apparatus comprising: a horizontally extending, overhead, generally Y-shaped carriage support providing a horizontally elongated leg portion and a pair of arm portions extending divergently from one end of said leg portion to horizontally relatively widely, spaced parallel relation; means supporting said carriage support in a position with said arm portions spaced above the shore adjoining the body of water into which a boat is to be launched and with said leg portion spaced above said body, said arm portions being free from obstruction therebelow to moving a vehicle having said boat thereon to a position with the bow of said boat below and adjacent to one arm portion of said pair and with the stern of said boat below and adjacent to the other arm portion, a carriage supported on said carriage support for movement from said arm portions and extending between them to a position at right angles thereto and on said leg portion, means for so supporting said carriage and supporting said carriage for automatic rotation thereof about its vertical axis during said movement from said arm portion to said leg portion, means on said carriage for lifting a boat from such vehicles below said arm portions and for suspending said boat from said carriage during said movement of the latter, said leg portion comprising a pair of parallel tracks in relatively close side by side relation and said arm portions being extensions of said tracks.

7. Boat launching apparatus comprising: a horizontally extending, overhead, generally Y-shaped carriage support providing a horizontally elongated leg portion and a pair of arm portions extending divergently from one end of said leg portion to horizontally, relatively, widely spaced parallel relation; means supporting said carriage support in a position with said arm portions spaced above the shore adjoining the body of water into which a boat is to be launched and with said leg portion spaced above said body, said arm portions being free from obstruction therebelow to moving a vehicle having said boat thereon to a position with the bow of said boat below and adjacent to one arm portion of said pair and with the stern of said boat below and adjacent to the other arm portion, a carriage supported on said carriage support for movement from said arm portions and extending between them to a position at right angles thereto and on said leg portion, means for so supporting said carriage and supporting said carriage for automatic rotation thereof about its vertical axis during said movement from said arm portion to said leg portion, means on said carriage for lifting a boat from such vehicle below said arm portions and for suspending said boat from said carriage during said movement of the latter, said leg portion comprising a single track, said arm portions comprising a pair of tracks, a gap in the convergently extending portions of said pair of tracks, a movable switch track in said gap in extension of said single track movable relative to said convergently extending portions for alternately connecting them with the end of said single track, and means connected with said carriage for alternately connecting said convergently extending portions with said single track upon movement of said carriage from said pair of tracks onto said single track, and for supporting said carriage during turning rotation thereof about its vertical axis.

8. In boat launching apparatus that includes an overhead carriage support and a carriage movable thereon; a horizontally elongated frame having opposite ends and side frame members connecting them, a pair of vertical cables respectively adjacent to said side frame members and at each end of said frame suspending said frame from said carriage, power means on said carriage connected with said cable for moving them vertically for lifting and for lowering said frame, a pair of crossbars extending across and supported on said side frame members at their opposite end portions respectively and movable different distances therealong, and a sling depending from each of said crossbars adapted to extend under the opposite ends of a boat.

9. In boat launching apparatus that includes an overhead carriage support and a carriage movable thereon; a horizontally elongated frame having opposite ends and side frame members connecting them, a pair of vertical cables respectively adjacent to said side frame members and at each end of said frame suspending said frame from said carriage, power means on said carriage connected with said cable for moving them vertically for lifting and for lowering said frame, a pair of crossbars extending across and supported on said side frame members at their opposite end portions respectively and movable different distances therealong, and a sling depending from each of said crossbars adapted to extend from the ends of said crossbars and means on said crossbars at their ends for supporting the ends of said sling different distances from the center of each crossbar.

10. In boat launching apparatus that includes an overhead carriage support and a carriage movable thereon; a horizontally elongated frame having opposite ends and side frame members connecting them, a pair of vertical cables respectively adjacent to said side frame members and at each end of said frame suspending said frame from said carriage, power means on said carriage connected with said cable for moving them vertically for lifting and for lowering said frame, a pair of crossbars extending across and supported on said side frame members at their opposite end portions respectively and movable different distances therealong, and a sling depending from each of said crossbars adapted to extend under the opposite ends of a boat, one of the cables of each pair thereof adjacent to opposite of said side frame members being shorter than the other to prevent objectionable swinging of said frame about a vertical axis.

11. Apparatus for conveying a horizontally elongated load from one point to another comprising: a horizontally extending, overhead, generally Y-shaped carriage support providing a horizontally elongated leg portion and a pair of arm portions extending divergently relative to each other from one end of said leg portion to horizontally spaced relation; means supporting said carriage support spaced above the load to be carried; a carriage having a forward and a rear end, means on said carriage for suspending said load therefrom in a horizontally extending position of said load with opposite ends of said load adjacent to said forward and rear ends respectively, means mounting said carriage on said carriage support for movement thereof from a position with said forward and near ends respectively carried by said arm portions to a position onto said leg portion with said forward and rear ends on a line substantially parallel with said leg portion whereby such load suspended from said carriage during said movement thereon from said arms to said leg portion will be rotated about a vertical axis through approximately 90 degrees and to a position for loading or unloading below said leg portion.

References Cited in the file of this patent

UNITED STATES PATENTS

| | | |
|---|---|---|
| 1,524,067 | Troutman et al. | Jan. 27, 1925 |
| 1,802,220 | Romine | Apr. 21, 1931 |
| 2,829,781 | Nomsen | Apr. 8, 1958 |
| 2,889,062 | Stearn | June 2, 1959 |
| 2,896,795 | Kersting | July 28, 1959 |